US012639907B2

(12) United States Patent
Bjelcevic et al.

(10) Patent No.: US 12,639,907 B2
(45) Date of Patent: *May 26, 2026

(54) MULTIVIEW ASSOCIATION OF MULTIPLE ITEMS FOR ITEM RECOGNITION

(71) Applicant: NCR Voyix Corporation, Atlanta, GA (US)

(72) Inventors: Stefan Bjelcevic, Roswell, GA (US); Christian Lee McDaniel, Atlanta, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 652 days.

This patent is subject to a terminal disclaimer.

(21) Appl. No.: 17/732,978

(22) Filed: Apr. 29, 2022

(65) Prior Publication Data

US 2023/0252750 A1 Aug. 10, 2023

Related U.S. Application Data

(63) Continuation-in-part of application No. 17/665,145, filed on Feb. 4, 2022.

(51) Int. Cl.
*G06V 10/12* (2022.01)
*G06Q 20/20* (2012.01)
(Continued)

(52) U.S. Cl.
CPC .......... *G06V 10/12* (2022.01); *G06Q 20/208* (2013.01); *G06T 7/194* (2017.01); *G06T 7/50* (2017.01);
(Continued)

(58) Field of Classification Search
CPC ...... G06V 10/12; G06V 10/22; G06V 10/764; G06V 10/82; G06V 10/16; G06V 10/762;
(Continued)

(56) References Cited

U.S. PATENT DOCUMENTS

| | | | |
|---|---|---|---|
| 11,481,751 B1 * | 10/2022 | Chaubard | .............. G06V 10/82 |
| 2015/0242943 A1 * | 8/2015 | Abovitz | ................ G02B 27/42 |
| | | | 705/27.2 |

(Continued)

FOREIGN PATENT DOCUMENTS

WO WO-2023053026 A1 * 4/2023 ........... G06Q 20/047

OTHER PUBLICATIONS

EP Examination Report dated Feb. 14, 2025.

*Primary Examiner* — Tracy Mangialaschi
(74) *Attorney, Agent, or Firm* — Schwegman Lundberg & Woessner, P.A.

(57) ABSTRACT

Images of a transaction area comprising items are received during a checkout. Red-Green-Blue (RGB) data and Depth data are received with each image. Pixels captured in any given image by a given camera are pre-aligned with physical locations of a transaction area. Depth data provided by each camera and that camera's pre-alignment to the area are processed to map pixels in each image taken to X-Y coordinates within the area. X-Y coordinates for each item and for each image are grouped together as a single item within the area. RGB data for each image and item is used as a set of image patches per item. For each item, the corresponding patches are passed to a classification Machine-Learning Model (MLM) that returns an item code for each patch. A particular item code is selected for each set and the item codes are used to process the checkout.

20 Claims, 3 Drawing Sheets

(51) Int. Cl.

| | |
|---|---|
| *G06T 7/194* | (2017.01) |
| *G06T 7/50* | (2017.01) |
| *G06T 7/70* | (2017.01) |
| *G06V 10/22* | (2022.01) |
| *G06V 10/762* | (2022.01) |
| *G06V 10/764* | (2022.01) |

(52) U.S. Cl.
CPC ................ *G06T 7/70* (2017.01); *G06V 10/22* (2022.01); *G06V 10/762* (2022.01); *G06V 10/764* (2022.01); *G06T 2207/10024* (2013.01); *G06T 2207/10028* (2013.01); *G06T 2207/30242* (2013.01)

(58) Field of Classification Search
CPC ...... G06V 10/255; G06V 20/64; G06V 20/52; G06T 7/50; G06T 7/194; G06T 7/70; G06T 2207/10024; G06T 2207/30242; G06Q 20/20; G06Q 20/208; G06Q 30/06
See application file for complete search history.

(56) References Cited

U.S. PATENT DOCUMENTS

| | | | |
|---|---|---|---|
| 2019/0108396 A1 | 4/2019 | Dal Mutto et al. | |
| 2020/0143172 A1* | 5/2020 | Zucker ................... | G06V 20/52 |
| 2022/0019988 A1* | 1/2022 | Chilukuri ............... | H04N 23/61 |
| 2024/0354731 A1* | 10/2024 | Pandey ................ | G07G 1/0045 |

* cited by examiner

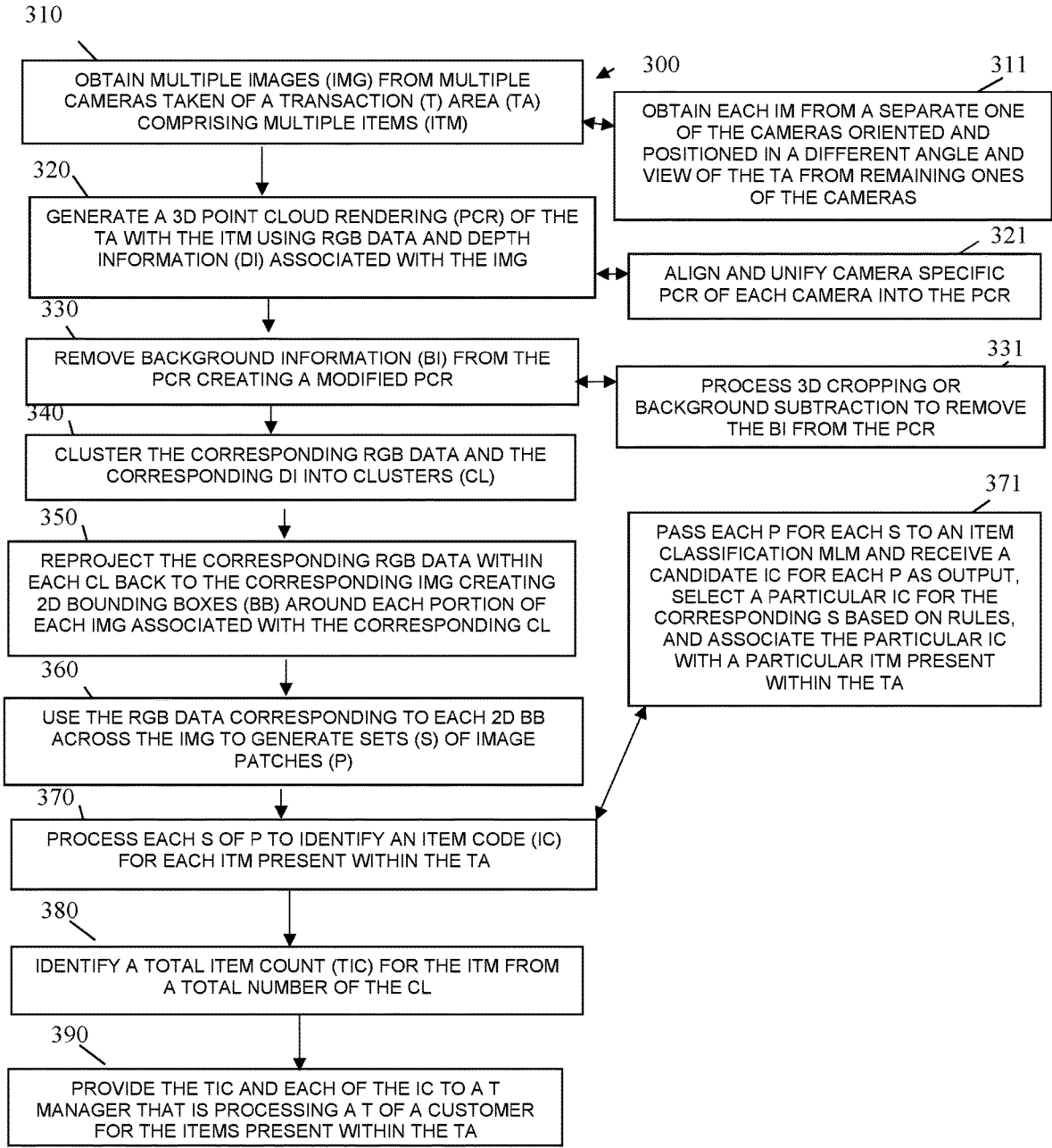

310

OBTAIN MULTIPLE IMAGES (IMG) FROM MULTIPLE CAMERAS TAKEN OF A TRANSACTION (T) AREA (TA) COMPRISING MULTIPLE ITEMS (ITM)

300

311

OBTAIN EACH IM FROM A SEPARATE ONE OF THE CAMERAS ORIENTED AND POSITIONED IN A DIFFERENT ANGLE AND VIEW OF THE TA FROM REMAINING ONES OF THE CAMERAS

320

GENERATE A 3D POINT CLOUD RENDERING (PCR) OF THE TA WITH THE ITM USING RGB DATA AND DEPTH INFORMATION (DI) ASSOCIATED WITH THE IMG

321

ALIGN AND UNIFY CAMERA SPECIFIC PCR OF EACH CAMERA INTO THE PCR

330

REMOVE BACKGROUND INFORMATION (BI) FROM THE PCR CREATING A MODIFIED PCR

331

PROCESS 3D CROPPING OR BACKGROUND SUBTRACTION TO REMOVE THE BI FROM THE PCR

340

CLUSTER THE CORRESPONDING RGB DATA AND THE CORRESPONDING DI INTO CLUSTERS (CL)

371

PASS EACH P FOR EACH S TO AN ITEM CLASSIFICATION MLM AND RECEIVE A CANDIDATE IC FOR EACH P AS OUTPUT, SELECT A PARTICULAR IC FOR THE CORRESPONDING S BASED ON RULES, AND ASSOCIATE THE PARTICULAR IC WITH A PARTICULAR ITM PRESENT WITHIN THE TA

350

REPROJECT THE CORRESPONDING RGB DATA WITHIN EACH CL BACK TO THE CORRESPONDING IMG CREATING 2D BOUNDING BOXES (BB) AROUND EACH PORTION OF EACH IMG ASSOCIATED WITH THE CORRESPONDING CL

360

USE THE RGB DATA CORRESPONDING TO EACH 2D BB ACROSS THE IMG TO GENERATE SETS (S) OF IMAGE PATCHES (P)

370

PROCESS EACH S OF P TO IDENTIFY AN ITEM CODE (IC) FOR EACH ITM PRESENT WITHIN THE TA

380

IDENTIFY A TOTAL ITEM COUNT (TIC) FOR THE ITM FROM A TOTAL NUMBER OF THE CL

390

PROVIDE THE TIC AND EACH OF THE IC TO A T MANAGER THAT IS PROCESSING A T OF A CUSTOMER FOR THE ITEMS PRESENT WITHIN THE TA

FIG. 3

MULTIVIEW ASSOCIATION OF MULTIPLE ITEMS FOR ITEM RECOGNITION

RELATED APPLICATIONS

The present application is Continuation-In-Part (CIP) of application Ser. No. 17/665,145 entitled "Multi-Item Product Recognition for Checkouts" filed on Feb. 4, 2022, the disclosure of which is incorporated in its entirety herein and below.

BACKGROUND

Item recognition by itself is a difficult task when the number of images for the item is small and when some of the images occlude the item. Multi-item recognition is even more difficult for many reasons, such as more occlusion of items that is present in the images (the items can be placed in front of one another). In fact, placing many items in one area at once inevitably leads to some items blocking the view of other items. Even if some of the item is visible in an image, a key identifying feature of that item may still be out of sight or blocked.

Many retailers offer a variety of forms of checkout to their customers. For example, cashier-assisted checkouts allow customers to place items on the conveyor belt and a cashier handles each item to scan or enter its item code and takes payment from the customer for checkout while operating a Point-Of-Sale (POS) terminal. Self-Service Terminals (SSTs) allow customers to scan or enter their own item barcodes and make payment for self-checkouts. Some retailers allow customers to use a mobile application to scan or enter item barcodes as the customers shop and pay either at a SST, POS terminal, of via the mobile application for checkout.

The goal of the industry is to permit frictionless checkouts where cameras and sensors associate the customer with an account within a store, monitor items the customer picks up, recognize the items from images of the camera, and charge a payment for the transaction of the customer when the customer leaves the store.

Frictionless shopping also encounters the occlusion problem because a customer's hands or other items may occlude an item and the item may be stacked onto other items within a customer's bag or basket such that a good image of the item may not be capable of being obtained to identify the item.

Convenience stores usually have small baskets and checkouts involve store assistants available to assist shoppers to enter or scan item codes (UPC) at Point-Of-Sale (POS) terminals operated by the store assistants. Unfortunately, convenience stores lack the physical space to install Self-Service Terminals (SSTs), which would allow the shoppers to perform self-checkouts with their items.

The challenge in any of these approaches is how to minimize item occlusion and deal with item occlusion while at the same time improving item identification using vision-based techniques, such that checkouts can occur without any item barcode scanning to speed up transactions and checkouts while minimizing misidentification of items and missing items completely that are associated with the checkouts.

SUMMARY

In various embodiments, a system and methods for multiview association of multiple items for item recognition are presented.

According to an embodiment, a method for multiview association of multiple items for item recognition is provided. A bounding box is obtained for each item depicted within each of a plurality of images captured of a transaction area; each image depicts multiple items located within the transaction area. Depth information and Red, Green, Blue (RGB) data fare obtained or each bounding box of each image. Each item represented within each bounding box is mapped to physical locations within the transaction area using the depth information. An RGB image patch is identified in each bounding box using the mapping. A set of RGB image patches are associated with a unique item that is present within the transaction area. The item codes for the items are provided using the sets of the RGB image patches for a transaction associated with a customer.

BRIEF DESCRIPTION OF THE DRAWINGS

FIG. 3 is a diagram of another method for multiview association of multiple items for item recognition, according to an example embodiment.

DETAILED DESCRIPTION

Figure 1:
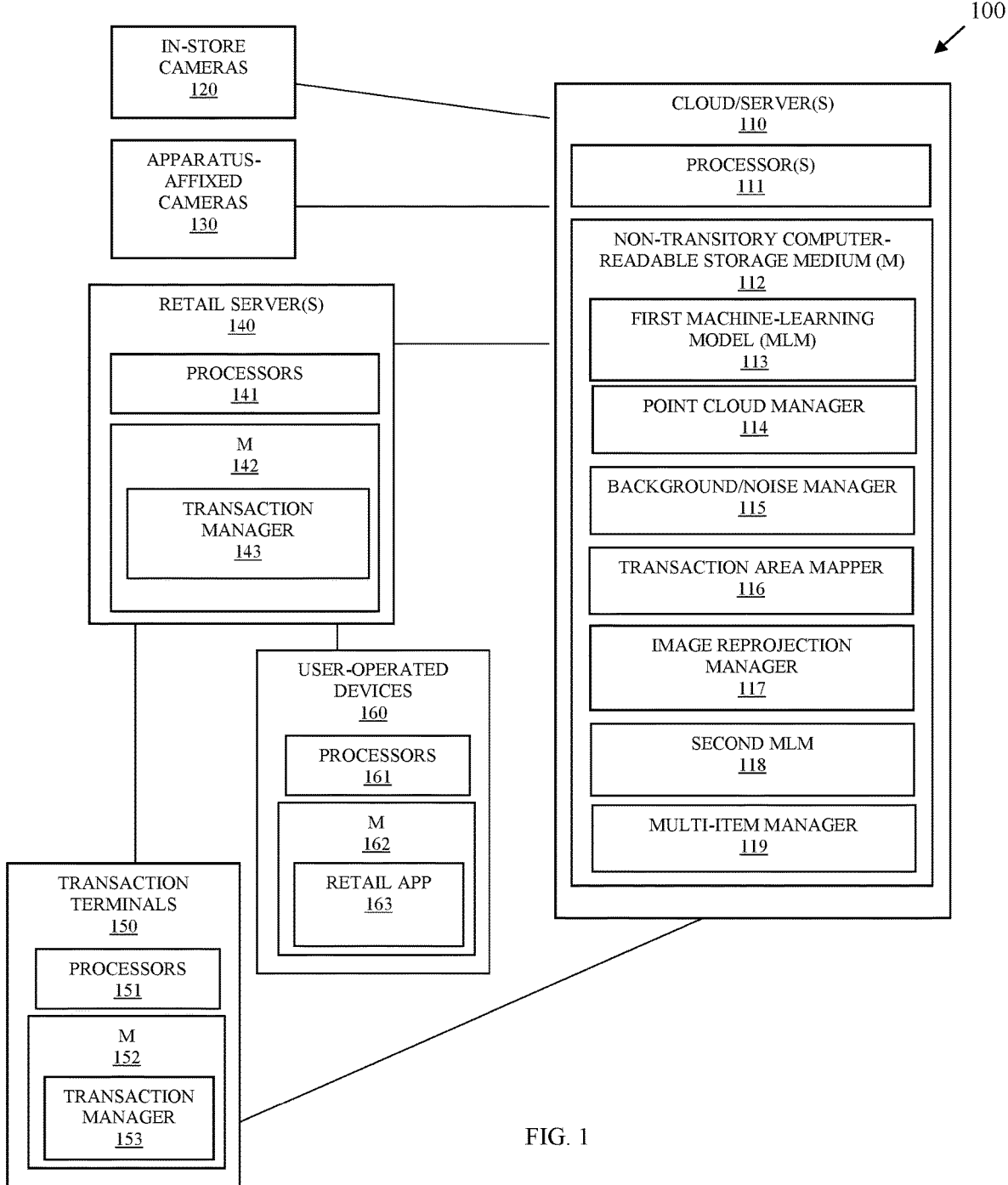
FIG. 1 is a diagram of a system for multiview association of multiple items for item recognition, according to an example embodiment.

FIG. 1 is a diagram of a system 100 for multiview association of multiple items for item recognition, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of multiview association of multiple items for item recognition, presented herein and below.

As used herein a "scene" refers to a defined area where a set or multi-items of a customer are being monitored through multiple images taken at multiple different angles. The multi-items can be stationary or can be moving with the customer in a basket, a cart, in their hands and arms, or in a bag. The area can be any predefined shape, predefined size, and predefined dimensions.

A "transaction area" refers to the defined area of the scene that is captured in the multiple images, such as an inside portion of a cart, and inside portion of a basket, a countertop of a transaction terminal, the hands, arms, and torso of an individual.

System 100 illustrates two approaches by which multiple images of a scene that comprises multiple items within a transaction area is processed to identify each of the items (item code identification). Multiple cameras at different angles and from difference perspective views capture an image of the scene. Multiple images from multiple cameras of the transaction area minimizes the chance that items are going to being occluded because at least one camera of the multiple cameras is likely to capture a given item with a non-occluded view in its image. However, partial occlusion can still occur.

Moreover, item recognition by a Machine-Learning Model (MLM) works best when there is as much pixel data as possible for a given item and the corresponding pixel data is completely missing extraneous pixels not associated with the given item (such as background pixels or pixels associated with a different item other than the given item).

The two approaches discussed herein and below with system 100 achieves an optimal amount of unique pixel data for a given item in a scene using multiple views of the given item, such item recognition is achieved accurately and efficiently even when the given item is occluded or partial occluded in some or even all of the multiple images for the scene.

In a first approach, a Convolutional Neural Network CNN MLM is processed on the multiple images of the scene for the transaction area. The CNN MLM is trained to return bounding boxes for each image. Each bounding box within each image estimating the boundaries of each item present in the transaction area. Each image is associated with a Red-Green-Blue (RGB) image and depth-based image (the cameras capturing the images are depth-enabled cameras).

Even though there are two images (RGB and Depth) provided by each camera, the pixel coordinates for the two images align with one another, such that the depth information can be directly mapped to the corresponding RGB data for the corresponding bounding box. This allows identification of the unique items within the bounding boxes and associations of the depth information for the unique items. The average depth information for a given bounding box provides an estimate on the distance that the given item for the given bounding box is away from the corresponding camera that provided the corresponding RGB image with the corresponding depth image.

Once an item's distances are determined for each camera, the coordinates for the center of each bounding box for each image is determined to provide an estimate as to where the item is within the transaction area. Next, the X-Y pixel coordinates within the transaction area for the item of each bounding box for a given item is estimated (the actual location within the transaction area that the item is located). During configuration of each camera aimed at the transaction area, the pixels captured by each camera is mapped to the real-world coordinates of the transaction area. The RGB data for each item's image patch are then passed to a second different CNN MLM and a prediction is returned as to what the corresponding item's code is.

Additionally, the mapping of each image patch to the real-world coordinates of the transaction area allows each item's set of image patches (set of RGB data) to be grouped together. This provides a total number of the items that are present in the transaction area.

If the second CNN MLM returns a same item code for each of the image patches of a given item, then that item code is assigned to the corresponding item. However, if the CNN MLM returns different items for the image patches of a given item, the item code is selected that was picked the most times by the second CNN MLM. For example, suppose for 6 item patches of a can of coke processed through the second CNN MLM, an item code X was returned for 3 of the patches, while 1 patch returned item code Y, and two patches returned item code A.

In a second approach of system 100, the RGB images and the depth images returned by cameras for the transaction area are processed to create a three-dimensional (3D) unified point cloud rendering of the transaction area. Known background and noise pixel and depth information are removed from the 3D point cloud. The remaining RGB data and depth information are clustered together, and the clustered background/noise free 3D point cloud is reprojected back to the original images to obtain each item's image patches. Each camera's 3D point cloud is aligned, such that each camera can be used in unison to build on top of one another, similar to image stitching but this occurs in 3D because of the depth information.

With the unified point cloud from multiple camera views, an accurate 3D representation of the scene for the transaction area can be created. But, since only the items within the transaction area are of import, 3D cropping, or background subtraction is processed on the unified point cloud. With the background information removed, the modified unified point cloud provides a representation of the scan zone (area of interest for item recognition) for the transaction area. The modified unified point cloud can be visualized as floating blobs in space within the corresponding image of the unified point cloud, each blob representing one of the items in the scan zone.

Because the modified 3D point cloud is unified, there exists distinctive areas for each item that represent a 3D bounding box around each unique item. For each 3D bounding box, the RGB components for each box (item) is reprojected back to the original RGB images and a 2D bounding box is placed around the pixels in each of the images for the given item (associated with the corresponding 3D bounding box). This creates 2D RGB image patches for each of the items (each item having as many RGB image patches as there were images taken by the cameras of the multiview scene for the transaction area). Each item's set of RGB image patches is then provided to the second CNN MLM and item codes are returned as output, any particular item code receiving the most outputs from the CNN MLM is selected as the item code to use.

After approach 1 or approach 2 is taken for a given transaction, the item codes for the items in the transaction area are returned to a transaction manager. The transaction manager looks the item codes up and obtains item details and item pricing and checkouts a customer for the transaction.

It is within this context, that the above-referenced embodiments and other embodiments are now discussed with references to the FIGS. beginning initially with FIG. 1 and system 100.

System 100 comprises a cloud/server 110, in-store cameras 120, apparatus-affixed cameras 130, one or more retail server 140, transaction terminals 150, and user-operated devices 160.

Cloud/Server 110 comprises a processor 111 and a non-transitory computer-readable storage medium 112. Medium 112 comprises executable instructions for a first MLM 113, a point cloud manager 114, a background/noise manager 115, a transaction area mapper 116, an image reprojection manager 117, a second MLM 118, and a multi-item management 119. The executable instructions when provided or obtained by the processor 111 from medium 112 cause the processor 111 to perform operations discussed herein with respect to 113-119.

In-store cameras 120 may be stationary cameras placed throughout a store, such as overhead cameras situated overhead of transaction areas of terminals 150 and/or situated along side countertops associated with terminals 150.

Apparatus-affixed cameras 130 may be affixed to the sides of baskets and carts. One camera 130 for a cart or a basket may be placed along a top edge of the cart or basket and pointed down into the basket or cart. Other cameras 130 for the cart or basket may be affixed to 2 or more sides of the cart or basket focused into the cart or basket.

In an embodiment, only apparatus-affixed cameras 130 are used for the embodiments discussed below.

In an embodiment, only in-store cameras 120 are used for the embodiments discussed below.

In an embodiment, a combination of in-store cameras and apparatus-affixed cameras 130 are used for the embodiments discussed below.

In an embodiment, 3 cameras 120 and/or 130 are used for the embodiments discussed below.

In an embodiment, 4 cameras 120 and/or 130 are used for the embodiments discussed below.

In an embodiment, 5 or more cameras 120 and/or 130 are used for the embodiments discussed below.

In an embodiment, 6 or more cameras 120 and/or 130 are used for the embodiments discussed below.

In an embodiment, one or all of the cameras 120 and/or 130 are depth cameras, such that each image taken by the corresponding camera 120 and/130 comprises data for an 2D RGB image and a 3D depth image.

Each retail server 140 comprises at least one processor 141 and a non-transitory computer-readable storage medium 142. Medium 142 comprises executable instructions for a transaction manager 143. The executable instructions when provided or obtained by the processor 141 from medium 142 cause the processor 141 to perform operations discussed herein with respect to 143.

Each transaction terminal 150 comprises at least one processor 151 and a non-transitory computer-readable storage medium 152. Medium 152 comprises executable instructions for a transaction manager 153. The executable instructions when provided or obtained by the processor 151 from medium 152 cause the processor 151 to perform operations discussed herein with respect to 153.

Each user-operated device 160 comprises at least one processor 161 and a non-transitory computer-readable medium 162. Medium 162 comprises executable instructions for a retail application (app) 163. The executable instructions when provided or obtained by the processor 161 from medium 162 cause the processor 161 to perform operations discussed herein with respect to 163.

Multiple items or products are placed in a designated area that cameras 120 and 130 are focused on for capturing a scene of the items from the designated area of transaction area. The transaction area can be stationary (such as a countertop associated with terminals 150 or the transaction area can be moving with a customer that has the items placed in a cart (one type of apparatus) or a basket (another type of apparatus) equipped with apparatus-affixed cameras 130. In some cases, the transaction area is the arms, hands, and/or torso of a customer captured in a designated spot of a store where the customer is standing and facing the cameras 120 and/or 130 that take multiple images from different angles and perspectives of the arms, hands, and/or torso of the customer.

The images are streamed directly to multi-item manager 119 from the cameras 120 and/or 130 are streamed directly by cameras 120 and/130 into storage of a network-accessible file location that multi-item manager 119 monitors.

In a first technique or approach of system 100, the images of the scene for the transaction area are provided by multi-item manager 119 as input to first MLM 113. First MLM 113 returns the images with bounding boxes superimposed around each of the items that were present in the transaction area.

Each image is associated with a RGB sub image captured by one of the cameras 120 and/or 130 and a depth sub image captured by the same camera 120 and/or 130. The sub images are separate and independent images of the transaction area, one comprising RGB data and the other depth information/data.

Manager 119 receives the images and for each image aligns/maps the RGB data of sub image with the corresponding depth information/data of the depth sub image. Manager 119 then processes each bounding box within each image to obtain a distance that the corresponding camera 120 and/130 that took the corresponding image is from the corresponding item in the corresponding bounding box.

Transaction manager mapper 116 T averages the depth values to estimate a distance each item in each bounding box is away from the corresponding camera 120 and/or 130. Mapper 116 identifies a center of each bounding box and calculates or estimates where a given item is physically located within the transaction area. Next, the X-Y coordinates of each item within each bounding box is calculated. Recall, as was discussed above, that each camera 120 and/or 130 was configured to map its pixels coordinates for its images to the real-world coordinates of the scan zone or transaction area. So, mapper 116 identifies the X-Y coordinates of each item within each of its bounding boxes into a physical location of the transaction area.

At this point, manager 119 has identified each item within each bounding box and can extract the corresponding RGB data from each image's RGB sub image to create a set of image patches (set of pixel data) representing each item. Manager 119 passes the image patches as input to a second MLM 118 (an item classification trained MLM 118). For each patch in a set of image patches for a given item (the bounding boxes representing the set are known to be associated with one another based on mapper 116), the second MLM 118 returns an item code for the corresponding image patch provided as input. (Second MLM 118 may return a list of item codes but the highest sorted of best scored item code is selected for a given image patch by manager 119.) If a given set of patches for a given item, results in different item codes being supplied by the second MLM 118, manager 118 processes preconfigured rules to select a particular item code for the corresponding given item. For example, an item code is selected when a majority of the outputs from the second MLM 118 is associated with that item code.

Since each patch from each image is associated to real-world coordinates in the transaction area by mapper 116, the patches are grouped together based on their real-world coordinates. This results in groupings of all the patches from all the images into sets of patches. Each set is counted by manager 119 as a single item.

Manager 119 returns the total item count and each of the item codes for the items to transaction manager 143 and/or 153. Transaction manager 143 and/or 153 interacts with retail server 140 obtains each item's details and price information and processes a transaction on behalf of a customer. Notice at no point did an attendant nor the customer have to manually scan item codes off the items, the items were simply resting in the transaction area and the cameras 120 and/or 130 captured images of the transaction area and the corresponding item codes were returned directly to transaction manager 143 and/or 153.

In a second technique of approach of system 100, the first MLM 113 is not used. The images of a scene for a transaction area is received from the cameras 120 and/or 130. The cameras 120 and 130 have their point clouds (3D rendering of the transaction area aligned with one another during configuration of cameras 120 and/or 130). Point cloud manager 114 creates a unified view of the images from their different angles and perspective views and generates an aligned and unified 3D point cloud rendering of the transaction area. Background/Noise manager 115 removes the RGB data and depth data (using a 3D cropping technique) associated with known background information (basket, cart, countertop, etc.) and creates a background free or noise free modified unified 3D point cloud.

Manager 119 performs clustering on the remaining data of the modified unified 3D point cloud, each cluster associated with a particular item that was present in the scan zone or transaction area. Next, manager 119 encases each cluster (each item's data from all the images for that item) in a 3D bounding box. The clusters are counted to obtain a total item count for the items in the transaction area.

Image reprojection manager 117, associates each point in the modified and unified 3D point cloud back to the original RGB sub image taken by a particular camera 120 and/or 130 (this information was retained in the modified and unified 3D point cloud with metadata about each pixel). This allows image reprojection manager 117 to place a 2D bounding box around just the RGB data pixels in each of the original RGB sub images for each camera 120 and/or 130. This also creates sets of image patches for each item in the transaction area.

Manager 119 then passes each set of image patches as input to the second MLM 118 receiving for each image patch a predicted item code. Again, if the predicted item codes for a given set match, that item code is selected as the item code for the item. When the predicted item codes for a given set do not agree, manager 119 can process rules (as discussed above) for selecting a particular item code for the corresponding item present within the transaction area.

Manager 119 then provides to transaction manager 143 and/153 the total item count and the item codes for each item that was present in the transaction area (scan zone). Transaction manager 143 and/or 153 obtains the item details and processing and processes the transaction during a checkout for a customer. Again note that the items in the transaction area were not scanned, this was a frictionless checkout (no item code scanning was performed).

The two approaches demonstrate novel mechanisms by which item object occlusion can be minimized by when using multiple views of items placed within a transaction area for purposes of accurately identifying each item's item code and providing a frictionless checkout to a customer; the checkout did not require item code lookups by an attendant or a customer and did not require item code scanning by an attendant or a customer.

In an embodiment, the designated area/transaction area of the scene is 12 inches by 16 inches or roughly corresponds to the size of a cart, a food tray, a basket or a countertop at a convenience store.

In an embodiment, instead of using background pixel subtraction for the second approach via background/noise manager 115, the second approach uses an item segmentation MLM that is processed to create "masks" of where the items are located within the scene allowing pixel information outside the masks to be easily identified and removed.

These embodiments and other embodiments are now discussed with reference to the FIGS. 2-3.

Figure 2:
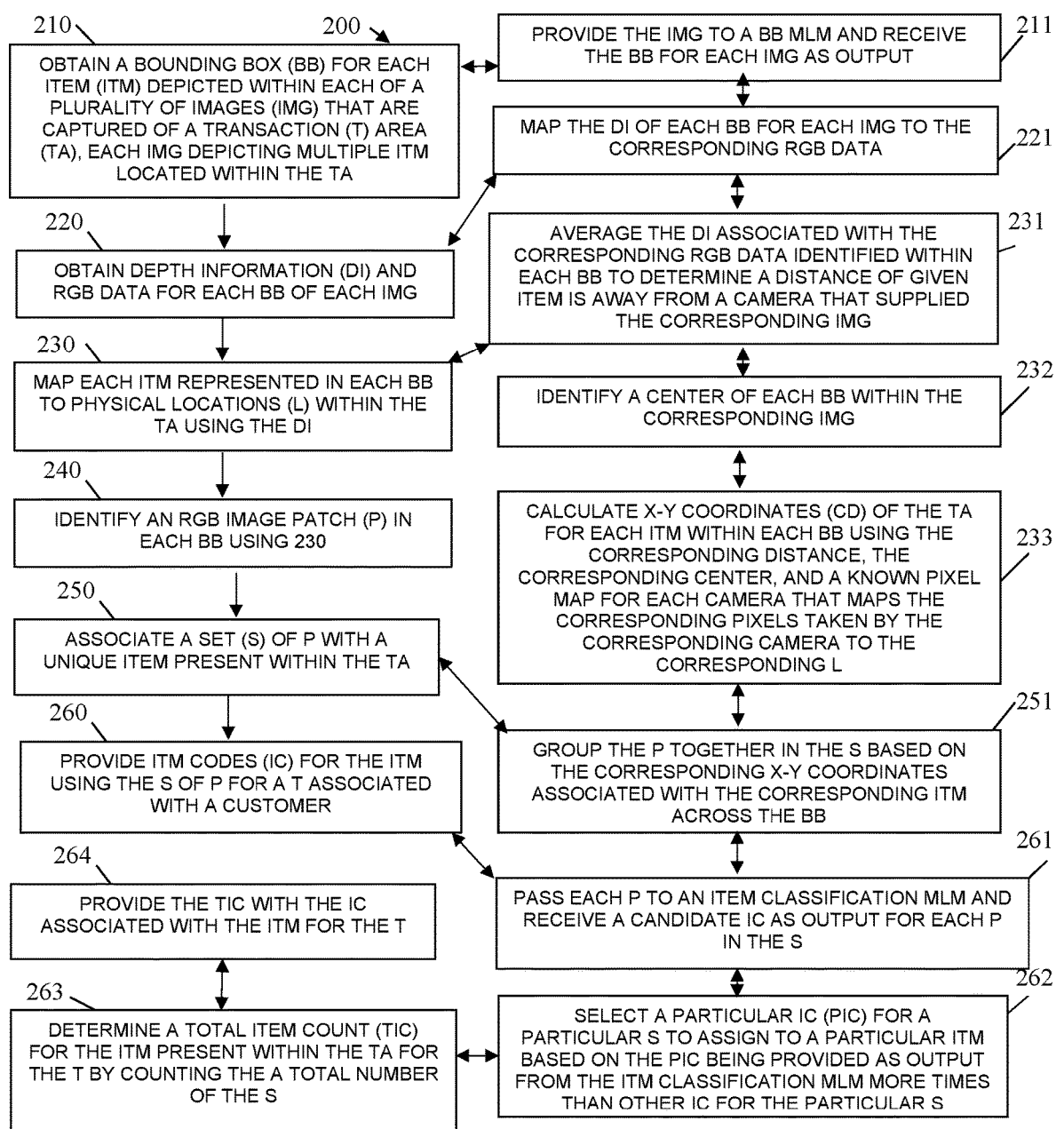
FIG. 2 is a diagram of a method for multiview association of multiple items for item recognition, according to an example embodiment.

FIG. 2 is a diagram of a method 200 for multiview association of multiple items for item recognition, according to an example embodiment. The software module(s) that implements the method 200 is referred to as a "multiview item recognition manager." The multiview item recognition manager is implemented as executable instructions programmed and residing within memory and/or a non-transitory computer-readable (processor-readable) storage medium and executed by one or more processors of a device. The processor(s) of the device that executes the multiview item recognition manager are specifically configured and programmed to process the multiview item recognition manager. The multiview item recognition manager has access to one or more network connections during its processing. The network connections can be wired, wireless, or a combination of wired and wireless.

In an embodiment, the multiview item recognition manager executes on cloud 110. In an embodiment, the multiview item recognition manager executes on server 110.

In an embodiment, the multiview item recognition manager is all or some combination of 113, 114, 115, 116, 117, 118, and 119.

At 210, the multiview item recognition manager obtains a bounding box for each item depicted within each of a plurality of images that are captured of a transaction area. Each image depicting multiple items that are located within the transaction area. Each camera providing the corresponding image providing the image from a different angle and a different perspective view then remaining ones of the cameras.

In an embodiment, at 221, the multiview item recognition manager provides the images to a bounding box MLM 113 as input and receives the bounding boxes for each image as output.

At 220, the multiview item recognition manager obtains depth information and RGB data for each bounding box of each image. This can be, as discussed above, a depth sub image and an RGB sub image for each image captured by each camera.

In an embodiment of 211 and 220, at 221, the multiview item recognition manager maps the depth information of each bounding box for each image to the corresponding RGB data.

At 230, the multiview item recognition manager maps each item represented in each bounding box to physical locations within the transaction area using the depth information.

In an embodiment of 221 and 230, at 231, the multiview item recognition manager averages the depth information associated with the corresponding RGB data identified within each bounding box to determine a distance of a given item away from a camera that supplied the corresponding image.

In an embodiment of 231 and at 232, the multiview item recognition manager identifies a center of each bounding box within the corresponding image.

In an embodiment of 232 and at 234, the multiview item recognition manager calculates X-Y coordinates of the transaction area for each item within each bounding box using the corresponding distance, the corresponding center, and a known pixel map for each camera that maps the corresponding pixels taken by the corresponding camera to the corresponding physical locations within the transaction area.

At 240, the multiview item recognition manager identifies an RGB image patch in each bounding box using the mapping of 230.

At 250, the multiview item recognition manager associates a set of RGB image patches with a unique item depicted or present within the transaction area.

In an embodiment of 233 and 250, at 251, the multiview item recognition manager groups the RGB image patches together in the set based on the corresponding X-Y coordinates with the corresponding item across all of the bounding boxes.

At 260, the multiview item recognition manager provides item codes for the items using the set of RGB image patches for a transaction associated with a customer.

In an embodiment of 251 and 260, at 261, the multiview item recognition manager passes each RGB image patch of each set to an item classification MLM 118 and receives a candidate item code for each RGB image patch in the corresponding set.

In an embodiment of 261 and at 262, the multiview item recognition manager selects a particular item code for a particular set of RGB image patches to assign to a particular item based on the particular item code being provided as output from the classification MLM 118 more times than other candidate item codes for the particular set.

In an embodiment of 262 and at 263, the multiview item recognition manager determines a total item count for the items present within the transaction area by counting a total number of the sets.

In an embodiment of 263 and at 264, the multiview item recognition manager provides the total item count with the item codes associated with the items to a transaction manager that is processing the transaction for a customer checkout.

FIG. 3 is a diagram of another method 300 for multiview association of multiple items for item recognition, according to an example embodiment. The software module(s) that implements the method 200 is referred to as a "multiview point cloud-based item identifier." The multiview point cloud-based item identifier is implemented as executable instructions programmed and residing within memory and/or a non-transitory computer-readable (processor-readable) storage medium and executed by one or more processors of a device. The processor(s) of the device that executes the multiview point cloud-based item identifier are specifically configured and programmed to process the multiview point cloud-based item identifier. The multiview point cloud-based item identifier has access to one or more network connections during its processing. The network connections can be wired, wireless, or a combination of wired and wireless.

In an embodiment, the device that executes the multiview point cloud-based item identifier is cloud 110. In an embodiment, the device that executes the multiview point cloud-based item identifier is server 110.

In an embodiment, the multiview point cloud-based item identifier is all or some combination of 113, 114, 115, 116, 117, 118, 119, and/or method 200.

At 310, the multiview point cloud-based item identifier obtains multiple images from multiple cameras taken of a transaction area comprising multiple items.

In an embodiment, at 311, the multiview point cloud-based item identifier obtains each image from a separate one of the cameras that is positioned in a different angle and view of the transaction area from remaining ones of the cameras.

At 320, the multiview point cloud-based item identifier generates a 3D point cloud rendering of the transaction area with the items using RGB data and depth information associated with the images.

In an embodiment, at 321, the multiview point cloud-based item identifier aligns and unifies camera-specific 3D point cloud renderings associated with each camera into a unified version of the 3D point cloud rendering.

At 330, the multiview point cloud-based item identifier removes background information (pixel data) from the 3D point cloud rendering creating a modified 3D point cloud rendering.

In an embodiment, at 331, the multiview point cloud-based item identifier processes 3D cropping or background subtraction to remove the background information from the 3D point cloud rendering.

At 340, the multiview point cloud-based item identifier clusters the corresponding RGB data and the corresponding depth information into clusters.

At 350, the multiview point cloud-based item identifier reprojects the corresponding RGB data within each cluster back to the corresponding image creating 2D bounding boxes around each portion of each image associated with the corresponding cluster.

At 360, the multiview point cloud-based item identifier uses the RGB data corresponding to each 2D bounding box across the images to generate sets of image patches, each set corresponding to an item present within the transaction area.

At 370, the multiview point cloud-based item identifier processes each set to identify an item code for each item present within the transaction area.

In an embodiment, at 371, the multiview point cloud-based item identifier passes each image patch for each set to an item classification MLM 118 and receives a candidate item code for each patch as output. The multiview point cloud-based item identifier selects a particular item code for the corresponding set based on rules and the multiview point cloud-based item identifier associates the particular item code with a particular item present within the transaction area.

In an embodiment, at 380, the multiview point cloud-based item identifier identifies a total item count for the items from a total number of the clusters.

In an embodiment of 380 and at 390, the multiview point cloud-based item identifier provides the total item count and each of the item codes to a transaction manager 143 and/or 153 that is processing a transaction of a customer for the items presenting within the transaction area during a checkout.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

obtaining a bounding box for each item depicted within each of a plurality of images that are captured of a transaction area, each image depicting multiple items located within the transaction area;

obtaining depth information and Red, Green, Blue (RGB) data for each bounding box of each image;

mapping each item represented within each bounding box to physical locations within the transaction area using the depth information;

identifying an RGB image patch in each bounding box using the mapping;

associating a set of RGB image patches with a unique item present in the transaction area; and providing item codes for the multiple items using sets of RGB image patches for a transaction associated with a customer by processing preconfigured rules to select a particular item code for a corresponding item when a given set of patches for the corresponding item results in different item codes being supplied by a machine-learning model (MLM), wherein an item code is selected when a majority of outputs from the MLM is associated with that item code;

wherein the transaction is processed during a frictionless checkout that does not require item code scanning by an attendant or the customer.

2. The method of claim 1, wherein obtaining the bounding box for each item further includes providing the plurality of images to a bounding box MLM and receiving particular bounding boxes for each image as output from the bounding box MLM.

3. The method of claim 2, wherein obtaining the depth information further comprises mapping the depth information of each bounding box for each image to corresponding RGB data.

4. The method of claim 3, wherein mapping further includes averaging the depth information associated with corresponding RGB data identified within each bounding box to determine a distance a given item is away from a camera that supplied a corresponding image.

5. The method of claim 4, wherein averaging further includes identifying a center of each bounding box within a corresponding image.

6. The method of claim 5, wherein identifying the center further includes calculating X-Y coordinates of the transaction area for each item within each bounding box using a corresponding distance, a corresponding center, and a known pixel map for each camera that maps corresponding pixels taken by a corresponding camera to corresponding physical locations.

7. The method of claim 6, wherein associating further includes grouping RGB image patches together in corresponding sets based on corresponding X-Y coordinates associated with a corresponding item across corresponding bounding boxes.

8. The method of claim 7, wherein providing further includes passing each set of RGB image patches to an item classification MLM and receiving a candidate item code as output from the item classification MLM for each RGB patch in a corresponding set.

9. The method of claim 8, wherein passing further includes selecting a particular item code for a particular set of RGB image patches to assign to a particular item based on the particular item code being provided as output from the item classification MLM more times than any other item codes that were provided as output from the item classification MLM for the particular set of RGB image patches.

10. The method of claim 9, wherein selecting further includes determining a total item count for the multiple items present within the transaction area for the transaction by counting a total number of each set of the RGB image patches.

11. The method of claim 10, wherein providing further includes providing the total item count with the item codes associated with the multiple items for the transaction.

12. A method, comprising:

obtaining multiple images from multiple cameras taken of a transaction area comprising multiple items;

generating a three-dimensional (3D) point cloud rendering of the transaction area with the multiple items using Red-Green-Blue (RGB) data and depth information associated with the multiple images by aligning each camera's 3D point cloud such that each camera can be used in unison to build on top of one another, similar to image stitching but occurring in 3D because of the depth information;

removing background information from the 3D point cloud rendering creating a modified 3D point cloud rendering;

clustering a corresponding RGB data and corresponding depth information into clusters;

reprojecting the corresponding RGB data within each cluster back to corresponding images creating two-dimensional (2D) bounding boxes around each portion of each image associated with a corresponding cluster;

using particular RGB data corresponding to each 2D bounding box across the multiple images to generate sets of image patches; and processing each set of image patches to identify an item code for each item present within the transaction area;

wherein corresponding item codes are provided to a transaction manager that processes a transaction during a frictionless checkout without requiring any item code scanning.

13. The method of claim 12 further comprising, identifying a total item count from a total number of the clusters.

14. The method of claim 13 further comprising, providing the total item count and each of the corresponding item codes to the transaction manager that is processing a transaction of a customer for the multiple items present within the transaction area.

15. The method of claim 12, wherein obtaining further includes obtaining each image from a separate one of the multiple cameras oriented and positioned in a different angle and view of the transaction area from remaining ones of the multiple cameras.

16. The method of claim 12, wherein generating further includes aligning and unifying camera specific 3D point cloud renderings of each camera into the 3D point cloud rendering.

17. The method of claim 16, wherein removing further includes processing 3D cropping or background subtraction to remove the background information from the 3D point cloud rendering.

18. The method of claim 16, wherein processing further includes passing each image patch for each set to an item classification machine-learning model (MLM) and receiving a candidate item code for each image patch as output, selecting a particular item code for a corresponding set based on rules, and associating the particular item code with a particular item present within the transaction area.

19. A system, comprising:

a plurality of depth cameras;

a server comprising at least one processor and a non-transitory computer-readable storage medium;

the non-transitory computer-readable storage medium comprises executable instructions; and the executable instructions when executed by the at least one processor from the non-transitory computer-readable storage medium cause the at least one processor to perform operations comprising:

obtaining images captured by the plurality of depth cameras of a transaction area, wherein the transaction area comprises items in a transaction of a customer;

processing depth information and Red-Green-Blue (RGB) data associated with each image and pixel alignment maps associated with each depth camera to determine physical locations of each of the items within the transaction area by averaging depth values to estimate a distance each item, in a bounding box, is away from a corresponding camera and calculating X-Y coordinates of each item within a corresponding bounding box into a physical location of the transaction area using preconfigured pixel coordinates mapping to real-world coordinates of the transaction area;

grouping corresponding RGB data associated with corresponding physical locations into groupings;

identifying a RGB image patch for each item within each image using the groupings;

assembling a set of RGB image patches per grouping;

passing each RGB image patch of each set to an item classification Machine-Learning Model (MLM) and receiving candidate item codes for each set of RGB image patches;

processing rules to select a particular item code for each set from corresponding candidate item codes and associating the particular item code with a particular one of the items represented in the images by a particular one of the groupings;

identifying a total item count for the items as a total number of the groupings; and providing the total item count and corresponding item codes for the items to a transaction manager that processes the transaction during a frictionless checkout for the customer without requiring any manual scanning of item codes by either the customer or an attendant.

20. The system of claim 19, wherein the plurality of depth cameras are affixed to a basket, or a cart carried by the customer or wherein the plurality of depth cameras are affixed to or surround the transaction area that is associated with a transaction terminal where the customer is performing the transaction.

* * * * *